(12) United States Patent
Shi et al.

(10) Patent No.: US 11,131,890 B2
(45) Date of Patent: Sep. 28, 2021

(54) LCD AND DISPLAY DEVICE

(71) Applicant: Beijing Xiaomi Mobile Software Co., Ltd., Beijing (CN)

(72) Inventors: Lei Shi, Beijing (CN); Lei Tang, Beijing (CN); Jian Li, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/735,289

(22) Filed: Jan. 6, 2020

(65) Prior Publication Data

US 2020/0341306 A1  Oct. 29, 2020

(30) Foreign Application Priority Data

Apr. 29, 2019 (CN) .......................... 201910356725.7

(51) Int. Cl.
  *G02F 1/1339* (2006.01)
  *G02F 1/1335* (2006.01)

(52) U.S. Cl.
  CPC ...... *G02F 1/1339* (2013.01); *G02F 1/133512* (2013.01); *G02F 1/133528* (2013.01); *G02F 2202/28* (2013.01)

(58) Field of Classification Search
  CPC .............. H04M 1/0264; H04N 5/2257; G02F 1/133528; G02F 2202/28; G02F 1/133608; G02F 1/133308; G02F 1/133311; G02F 1/133314; G02F 1/133317; G02F 1/133322
  See application file for complete search history.

(56) References Cited

U.S. PATENT DOCUMENTS

2012/0169961 A1* 7/2012 Ha .................... G02F 1/133308
                                                   349/61
2020/0186688 A1* 6/2020 Chen ................. G02F 1/133514

FOREIGN PATENT DOCUMENTS

| CN | 108957829 A | 12/2018 |
| CN | 109445162 A | 3/2019 |
| CN | 109597236 A | 4/2019 |
| CN | 110579898 A | 12/2019 |
| CN | 110888261 A | 3/2020 |

OTHER PUBLICATIONS

Extended European Search Report dated Jun. 17, 2020 in Patent Application No. 20159128.6, citing documents AO-AS therein, 7 pages.

* cited by examiner

*Primary Examiner* — Jessica M Merlin
(74) *Attorney, Agent, or Firm* — Oblon, McClelland, Maier & Neustadt, L.L.P.

(57) ABSTRACT

The present disclosure discloses an LCD and a display device, and belongs to the field of display technologies. The LCD can include an LCD panel, a backlight module, a sealant, and a first polarizer. The backlight module is located at one side of the LCD panel. The first polarizer is located between the LCD panel and the backlight module. The backlight module has a first through hole thereon and the first polarizer has a second through hole thereon. The first through hole, the second through hole, and the LCD panel define a blind hole. The sealant is adhered to an inner wall of the blind hole, and the sealant is fixedly connected to the backlight module, the LCD panel, and the first polarizer by bonding.

16 Claims, 3 Drawing Sheets

LCD AND DISPLAY DEVICE

CROSS REFERENCE

This application is based upon and claims priority to Chinese Patent Application No. 201910356725.7, filed on Apr. 29, 2019, the entire contents thereof are incorporated herein by reference.

TECHNICAL FIELD

The present disclosure relates to the field of display technologies, and in particular, to a liquid crystal display (LCD) and a display device.

BACKGROUND

With the development of display technology, a full screen display is a popular trend in the development of terminals, such as mobile phones. In a terminal such a full screen mobile phone, in order to arrange devices, such as a camera or a sensor, a panel structure with hole positioned in a display area of the LCD is generally used so as to achieve a higher screen ratio in the mobile phone.

When a photosensitive device, such as a camera or a sensor, is placed in the hole of the display area of the LCD, light emitted from the backlight assembly of the LCD tends to leak into the hole. This can affects the normal operation of the photosensitive device placed in the hole.

SUMMARY

Embodiments of the present disclosure provide an LCD and a display device which can solve the problem of light leakage in a blind hole structure of the LCD. In a first aspect, an exemplary embodiment of the present disclosure provides an LCD that can include an LCD panel, a backlight module, a sealant, and a first polarizer. The backlight module is located at one side of the LCD panel. The first polarizer is located between the LCD panel and the backlight module. The backlight module has a first through hole thereon and the first polarizer has a second through hole thereon. The first through hole, the second through hole, and the LCD panel define a blind hole. The sealant is adhered to an inner wall of the blind hole, and the sealant is fixedly connected to the backlight module, the LCD panel, and the first polarizer by bonding.

Optionally, the sealant is a structure by which the backlight module, the LCD panel, and the first polarizer are integrally bonded and fixedly connected. Further, the LCD panel can include a light shielding layer that surrounds the first through hole, and an orthographic projection of the sealant on the LCD panel is located in an orthographic projection of the light shielding layer on the LCD panel.

The light shielding layer can be located on a lower surface and/or an upper surface of the LCD panel, where the upper surface is a side of the LCD panel away from the first polarizer, and the lower surface is a side of the LCD panel adjacent to the first polarizer. Optionally, the light shielding layer can be located inside the LCD panel. The light shielding layer can also be located between the lower surface of the LCD panel and the first polarizer. The light shielding layer can be bonded to the sealant.

The LCD can further include a second polarizer, where the light shielding layer is located between the upper surface of the LCD panel and the second polarizer, and the second polarizer has a third through hole corresponding to the second through hole. In some embodiments, the light shielding layer is a black matrix disposed inside the LCD panel.

The LCD panel can further include a first light shielding layer or a second light shielding layer, where the first light shielding layer is located on an upper surface of the LCD panel and the second light shielding layer is located on a lower surface of the LCD panel. The light shielding layer can be located in an orthographic projection of the first light shielding layer or the second light shielding layer on the LCD panel.

In some exemplary embodiments, the LCD can further include a light shielding black adhesive layer, where the light shielding black adhesive layer is located between the backlight module and the first polarizer, and the light shielding black adhesive layer surrounds the first through hole.

A distance of a side of the light shielding layer away from a central axis of the first through hole and the central axis can be set to be not greater than a distance of a side of the light shielding black adhesive layer away from the central axis and the central axis.

The material of the sealant may be a hot melt adhesive. Further, the light shielding layer can be an ink layer.

In embodiments, a display area of the LCD panel can have a first area opposite to the blind hole and a second area except the first area, where a transmittance of the first area is greater than a transmittance of the second area.

Another embodiment of the present disclosure can further provide a display device including an LCD and an image capture device, wherein the LCD is the LCD described above and a photosensitive component of the image capture device is opposite to the blind hole.

Some beneficial effects brought by the technical solutions provided by the embodiments of the present disclosure can include at least that the backlight module is located at one side of the LCD panel, the first polarizer is located between the LCD panel and the backlight module, the backlight module has a first through hole, the first polarizer has a second through hole, and the first through hole, the second through hole and the LCD panel define a blind hole, thus a photosensitive device such as a camera can be disposed in the blind hole. The sealant is adhered to the inner wall of the blind hole and the sealant is fixedly connected to the backlight module, the LCD panel and the first polarizer by bonding, thereby preventing the light emitted by the backlight module from injecting into the blind hole from a location between the backlight module and the LCD panel to prevent or reduce the light from affecting the photosensitive device in the blind hole.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are only some embodiments of the present disclosure. Other drawings may also be obtained according to the drawings by those skilled in the art without any creative work.

DETAILED DESCRIPTION

The embodiments of the present disclosure will be further described in detail below with reference to the accompanying drawings, in order to make the objects, technical solutions, and advantages more clear.

In order to solve the installation problem of the front camera of the full screen mobile phone, a method of placing the camera in a hole in the display area of the LCD can be used. The hole of the LCD has two forms. The first form is a through hole where the through hole penetrates both the backlight module and the LCD panel of the LCD. The second form is a blind hole that only penetrates the backlight module of the LCD. Accordingly, the through hole can have a light transmittance that is higher than that of the blind hole. However, in the actual production, an opening area of the through hole is larger than that of the blind hole, and thus the through hole is not as good as the blind hole at improving a screen ratio. Additionally, the processing cost of the through hole is higher than that of the blind hole. Therefore, the mainstream approach is usually to open a blind hole in an LCD.

Figure 1:
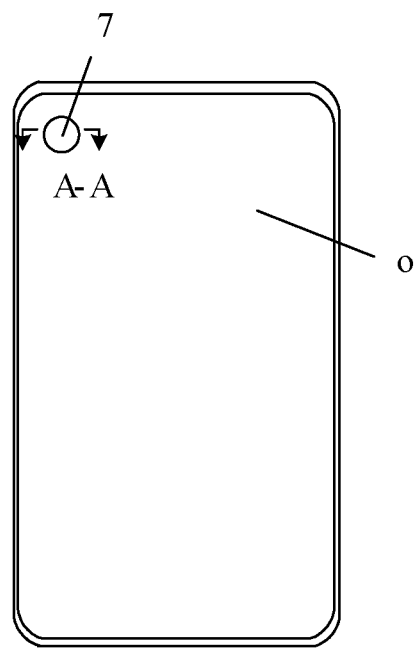
FIG. 1 is a schematic structural view of an exemplary LCD.

FIG. 1 is a schematic structural view of an LCD. As shown in FIG. 1, the display area "o" of the LCD has a blind hole 7 for setting a photosensitive device, such as a camera, for achieving a higher screen ratio.

Figure 2:
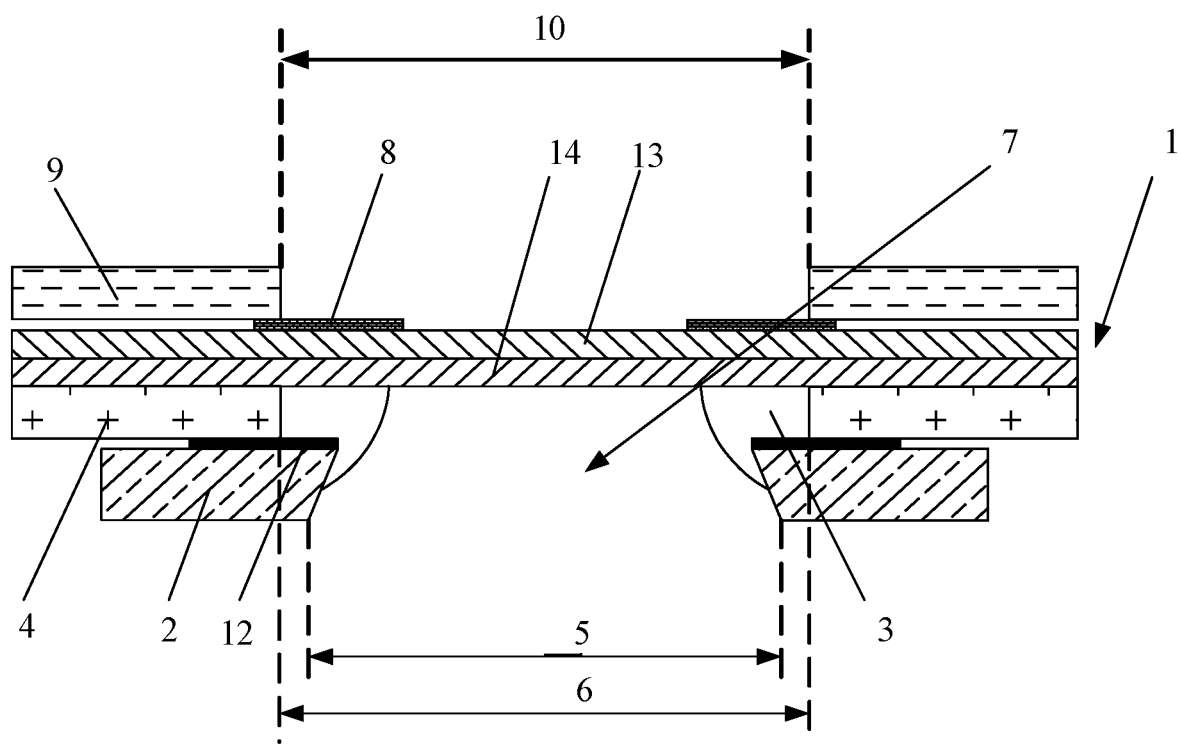
FIG. 2 is a schematic cross-sectional view of an LCD taken along a line A-A of FIG. 1 according to an exemplary embodiment of the present disclosure.

FIG. 2 is a schematic cross-sectional view of an LCD taken along a line A-A of FIG. 1 according to an exemplary embodiment of the present disclosure. As shown in FIG. 2, the LCD can include an LCD panel 1, a backlight module 2, a sealant 3, and a first polarizer 4. The backlight module 2 is located at one side of the LCD panel 1. The first polarizer 4 is located between the LCD panel 1 and the backlight module 2. The backlight module 2 has a first through hole 5. The first polarizer 4 has a second through hole 6. The first through hole 5, the second through hole 6, and the LCD panel 1 define a blind hole 7. The sealant 3 is bonded to an inner wall of the blind hole 7, and the sealant 3 is fixedly connected to the backlight module 2, the LCD panel 1, and the first polarizer 4 by bonding.

The backlight module 2 is located at one side of the LCD panel 1. The first polarizer 4 is located between the LCD panel 1 and the backlight module 2. The backlight module 2 has a first through hole 5. The first polarizer 4 has a second through hole 6. The first through hole 5, the second through hole 6, and the LCD panel 1 define a blind hole 7, and a photosensitive device, such as a camera, can be disposed in the blind hole. The sealant 3 is adhered to the inner wall of the blind hole 7, and the sealant 3 is fixedly connected to the backlight module 2, the LCD panel 1, and the first polarizer 4 by bonding, thereby preventing the light emitted by the backlight module 2 from injecting into the blind hole 7 from a location between the backlight module 2 and the LCD panel 1 to prevent the light from affecting the photosensitive device in the blind hole 7.

Optionally, the sealant 3 can be a structure by which the backlight module 2, the LCD panel 1, and the first polarizer 4 are integrally bonded and fixedly connected. Here, the sealant 3 may be formed at one time by one curing process after applying adhesive, obtaining the sealant 3 bonded on an inner wall of the first through hole 5 and the second through hole 6 and the LCD panel 1.

Optionally, a material of the sealant 3 can be a hot melt adhesive. The hot melt adhesive has a fast curing speed, good viscosity, simple bonding process and low cost. Illustratively, the sealant 3 provided by the embodiment of the present disclosure may be a light shielding hot melt adhesive having an optical density of more than 3.5, which can effectively block the light emitted by the backlight module 2.

For example, the backlight module 2 is used to provide a light source for the LCD. The backlight module is generally divided into a side-in backlight module and a direct type backlight module according to different incident positions of the light source. In the direct type backlight module, a light source, such as a CCFL (Cold Cathode Fluorescent Lamp) or an LED (Light Emitting Diode), is disposed behind the LCD panel and a surface light source is directly formed and supplied to the LCD panel. In the side-in backlight module, a backlight LED light bar is disposed on an edge of the back panel behind the LCD panel, and the light emitted by the LED light bar enters into the light guide plate (LGP) from a light enter surface on one side of the LGP, is reflected and diffused by the LGP, and is emitted from a light exit surface of the LGP, and is supplied to the LCD panel through the optical film group to form a surface light source. The embodiment of the present disclosure does not limit the type of the backlight module.

Optionally, the LCD panel 1 can have a light shielding layer 8 surrounding the first through hole 5, and the orthographic projection of the sealant 3 on the LCD panel 1 is located in the orthographic projection of the light shielding layer 8 on the LCD panel 1. By providing the light shielding layer 8 on the LCD panel 1 and causing the orthographic projection of the sealant 3 on the LCD panel 1 located in the orthographic projection of the light shielding layer 8a on the LCD panel 1, the sealant 3 in the blind hole 7 is blocked, and the appearance of the LCD is ensured.

Optionally, in the embodiment shown in FIG. 2, the light shielding layer 8 is located on an upper surface of the LCD panel 1, and the upper surface is a side of the LCD panel 1 away from the first polarizer 4. Illustratively, the LCD panel includes a first substrate 13 and a second substrate 14 opposite to each other, a liquid crystal layer (not shown) is disposed between the first substrate 13 and the second substrate 14, and the first polarizer 4 is located on a surface of the second substrate 14. The upper surface of the LCD panel 1 is a side of the first substrate 13 away from the liquid crystal layer.

Illustratively, in the LCD panel 1 provided by the embodiment of the present disclosure, the first substrate 13 is a color filter substrate, and the second substrate 14 is an array substrate.

Illustratively, a color film substrate generally includes a base substrate and a color film layer and a black matrix formed on the base substrate. The color film layer includes a plurality of filter units distributed in an array, and the black matrix is distributed among the plurality of filter units. Each filter unit corresponds to one sub-pixel, and the light emitted by each sub-pixel has a color after passing through the filter unit. Illustratively, the plurality of filter units can be divided into filter units of a plurality of colors, such as a red filter unit, a green filter unit, and a blue filter unit. Each of the filter units may be made of a color block of a corresponding color, for example, the red filter unit is made of a red color block. The base substrate may be made of a transparent material such as glass, plastic, or the like.

Illustratively, the array substrate generally includes a base substrate and a plurality of sub-pixel regions distributed in an array on the base substrate. The plurality of sub-pixel regions are in one-to-one correspondence with the sub-pixels on the color filter substrate, and each of the sub-pixel regions is provided with a thin film transistor (TFT).

In the embodiment of the present disclosure, the light shielding layer 8 on the first substrate 13 may be referred to as a first light shielding layer. Illustratively, the first light shielding layer may have an annulus shape.

Optionally, the light shielding layer 8 can be an ink layer. The ink has good light shielding performance and is firmly bonded to the LCD panel 1 and the hot-melt adhesive. Further, the ink layer can be coated on the LCD panel 1 by silk screen printing, and the ink layer is printed on the LCD panel 1 with precision higher than precision of the hot melt adhesive coated on the LCD panel 1, which improves the processing precision of the LCD.

Optionally, the LCD panel 1 further can include a second polarizer 9. The light shielding layer 8 is located between the upper surface of the LCD panel 1 and the second polarizer 9, and the second polarizer 9 has a third through hole 10 corresponding to the second through hole 6. In other words, the second through hole 6 and the third through hole 10 only need to correspond to each other in position, and a passage can be formed to allow light to pass therethrough. Optionally, a bore diameter of the third through hole 10 is the same as that of the second through hole 6. The third through hole 10 is disposed on the second polarizer 9, and the light can enter the blind hole 7 without passing through the second polarizer 9, thereby avoiding the influence of the polarizer on the light intensity, and thus avoiding the influence of the polarizer on the camera.

It should be noted that, in the exemplary embodiment of the present invention, since the first polarizer 4 and the second polarizer 9 respectively have the second through hole 6 and the third through hole 10 having the same bore diameter, the light can enter the blind hole 7 without passing through the second polarizer 9 and the first polarizer 4, thus the intensity of the light is not affected by the polarizer. Therefore, an area of the LCD corresponding to the blind hole 7 has a higher transmittance than other areas.

Optionally, the LCD further includes a light shielding black adhesive layer 12 between the backlight module 2 and the first polarizer 4, and the light shielding black adhesive layer 12 surrounds the first through hole 5. By bonding the backlight module 2 and the first polarizer 4 by using the light shielding black adhesive layer 12, cracks from which light is leaked, between the backlight module 2 and the first polarizer 4 can be avoided. Illustratively, the light shielding black adhesive layer 12 is annular.

Figure 3:
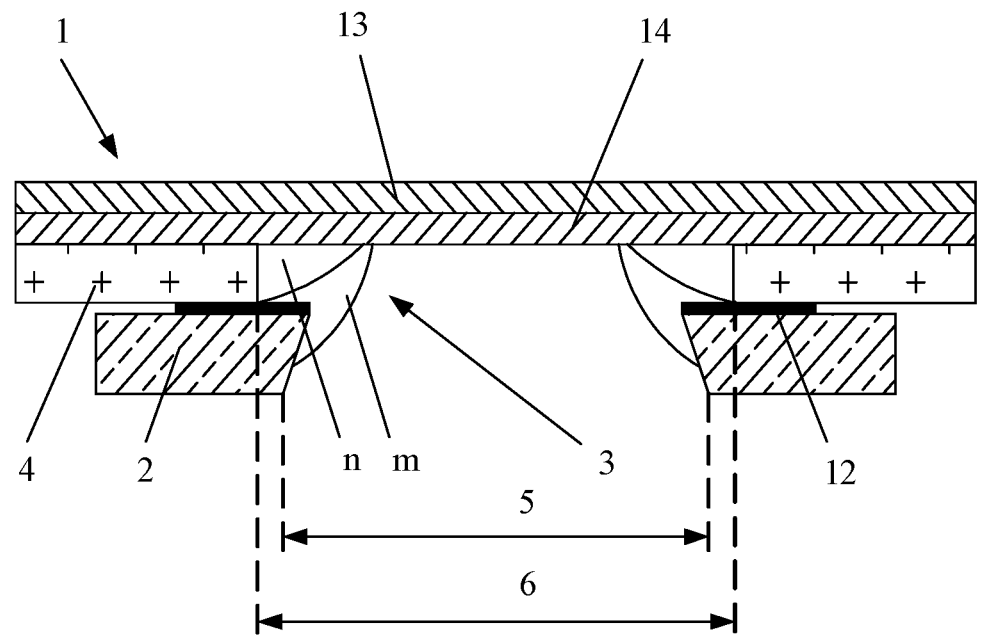
FIG. 3 is a schematic cross-sectional view of another LCD taken along the line A-A of FIG. 1 according to an exemplary embodiment of the present disclosure.

FIG. 3 is a schematic cross-sectional view of another LCD taken along the line A-A of FIG. 1 according to an exemplary embodiment of the present disclosure. The LCD shown in FIG. 3 is basically the same as the LCD shown in FIG. 2. The difference is that the sealant 3 in FIG. 3 is a two-layer structure, and the two-layer structure includes a backlight module sealant "m" adhered to an inner wall of the first through hole 5 and a polarizer sealant "n" adhered to an inner wall of the second through hole 6. The backlight module sealant "m" and the polarizer sealant "n" respectively block the lights emitted by the backlight module relative to the first through hole 5 and the second through hole 6.

It should be noted that the forming method of both types of sealants 3 in FIG. 2 and FIG. 3 can block the light of the backlight module 2 relative to the blind hole 7 and protect photographic properties of the photosensitive device of the camera disposed in the blind hole 7. Compared with the sealant 3 using the two-layer structure with the sealant 3 of the integral structure, in the two-layer structure, sealing an edge of the blind hole 7 by the sealant 3 requires two times of coating and two times of curing; while in the integral structure, the sealant 3 only requires one time of coating and one time of curing, which simplifies the processing steps, improves processing efficiency and reduces processing costs. Moreover, since the two-layer sealant 3 seals the edge of blind hole 7 by using two layers of sealant, stress may be generated after the two layers of sealant are cured, and the stress acts on the LCD panel 1 to cause a gap of the LCD panel increased, causing the liquid crystal to turn abnormally, thereby affecting the normal passage of light through the LCD panel 1, resulting in yellowing around the blind hole 7 of the LCD. Therefore, it is preferable to use an integral structure of the sealant to reduce bad effects on the LCD panel from the stress of the sealant.

Figure 4:
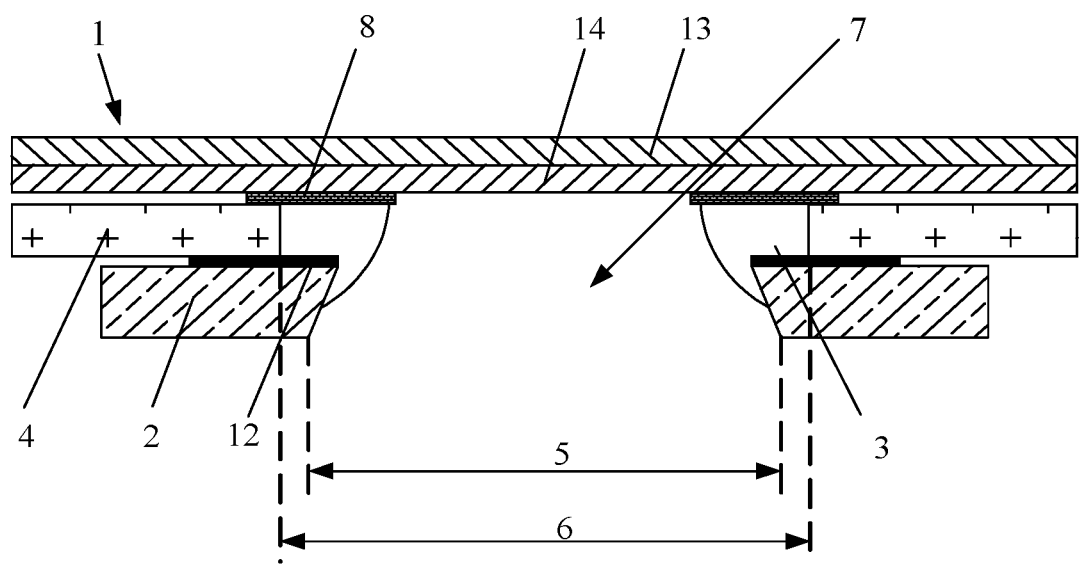
FIG. 4 is a schematic cross-sectional view of still another LCD taken along the line A-A of FIG. 1 according to an exemplary embodiment of the present disclosure.

FIG. 4 is a schematic cross-sectional view of still another LCD taken along the line A-A of FIG. 1 according to an exemplary embodiment of the present disclosure. The embodiment shown in FIG. 4 is basically the same as the embodiment shown in FIG. 2, except that the light shielding layer 8 in FIG. 4 is located on the lower surface of the LCD panel 1, that is, the side of the second substrate 14 away from the liquid crystal layer. In the embodiment of the present disclosure, the light shielding layer 8 located on the second substrate may be referred to as a second light shielding layer. Illustratively, the second light shielding layer has an annular shape, and the orthographic projection of the sealant 3 on the LCD panel 1 is located in the orthographic projection of the second light shielding layer in the LCD panel 1.

Optionally, in the embodiment shown in FIG. 4, the light shielding layer 8 can be located between the LCD panel 1 and the first polarizer 4.

As shown in FIG. 4, the light shielding layer 8 is bonded to the sealant 3. That is, the light shielding layer 8 is formed on the surface of the second substrate 14, and the sealant 3 is bonded to the region of the second substrate 14 on which the light shielding layer 8 is formed. By bonding the light shielding layer 8 to the sealant 3, it is more secure than a case that the light shielding layer 8 is directly connected to the surface of the LCD panel 1.

Figure 5:
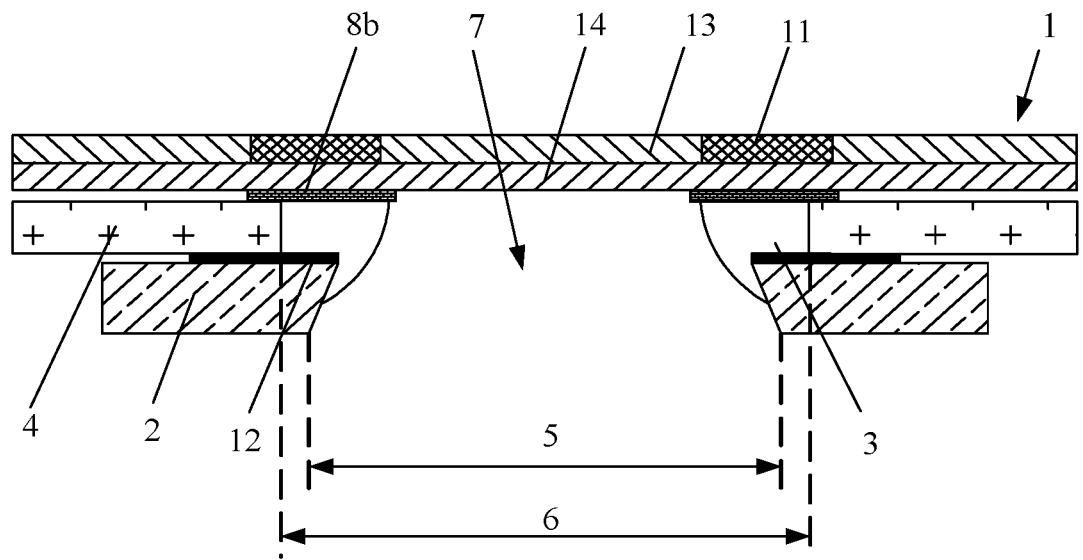
FIG. 5 is a schematic cross-sectional view of still another LCD taken along the line A-A of FIG. 1 according to an exemplary embodiment of the present disclosure.

FIG. 5 is a schematic cross-sectional view of still another LCD taken along the line A-A of FIG. 1 according to an exemplary embodiment of the present disclosure. The embodiment shown in FIG. 5 has basically the same structure as the embodiment shown in FIG. 4, except that, as shown in FIG. 5, the light shielding layer 8 is a black matrix disposed inside the LCD panel 1. In practice, the black matrix is usually located on the color film substrate. In the embodiment of the present disclosure, the black matrix includes a light shielding layer 8 surrounding the first through hole 5 in addition to the portions among the respective filter units.

Optionally, in FIG. 5, the LCD panel further can further include a second light shielding layer 8b located on a side of the second substrate 14 away from the liquid crystal layer (i.e., a lower surface of the LCD panel 1), and the light shielding layer 8 is located in the orthographic projection of the second light shielding layer 8b on the LCD panel 1. The light shielding layer 8 and the second light shielding layer 8b can perform multiple shielding of the light emitted by the backlight module 4, thereby improving the shielding effect.

It should be noted that, since the second light shielding layer 8b can be used for shielding, the black matrix may also include only the portion between the filter units, and does not include the light shielding layer 8, thereby simplifying the pattern of the black matrix.

Figure 6:
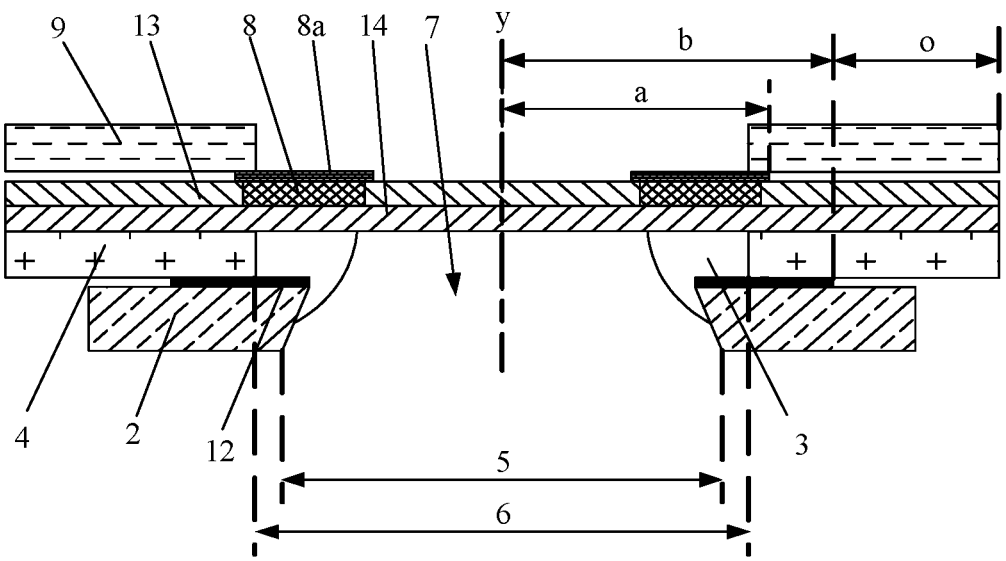
FIG. 6 is a schematic cross-sectional view of still another LCD taken along the line A-A of FIG. 1 according to an exemplary embodiment of the present disclosure.

FIG. 6 is a schematic cross-sectional view of still another LCD taken along the line A-A of FIG. 1 according to an exemplary embodiment of the present disclosure. The embodiment shown in FIG. 6 is basically the same as the embodiment shown in FIG. 5, except that the second light shielding layer 8b is replaced with the first light shielding layer 8a in FIG. 6. As shown in FIG. 6, the orthographic projection of the light shielding layer 8 on the first substrate 13 may be located in the first light shielding layer 8a.

Optionally, a distance "a" of a side of the first light shielding layer 8a away from the central axis "y" of the first through hole 5 and the central axis "y" is not more than a distance "b" of a side of the light shielding black adhesive layer 12 away from the central axis "y" and the central axis "y", that is, "a"≤"b". The light emitted by the backlight module 2 is vertically irradiated into a display area "o" on the LCD panel 1. Since b, the light emitted by the backlight module 2 can normally be irradiated on the display area "o" of the LCD panel, thereby avoiding the light shielding layer 8 blocking the display area "o" of the LCD.

It should be noted that, in the embodiment of the present disclosure, the light shielding layer is located on a side of the first substrate 13 away from the liquid crystal layer or a side of the second substrate 14 away from the liquid crystal layer, that is, a light shielding layer may be provided on the first substrate (for example, FIGS. 2 and 6), or a light shielding layer may be provided on the second substrate (for example, FIGS. 4 and 5). In other exemplary embodiments, the light shielding layer may also be located at the same time on the first substrate 13 and the second substrate 14, that is, the LCD panel 1 includes both the first light shielding layer and the second light shielding layer (for example, the first light shielding layer in FIG. 2 or FIG. 6 is used in combination with the second light shielding layer in FIG. 4 or FIG. 5). Further, the light shielding layer may only be located inside the LCD panel 1.

In addition, in the embodiment of the present disclosure, the display area of the LCD panel has a first area opposite to the blind hole 7 and a second area other than the first area, and the transmittance of the first area may be greater than that of the second area. In addition to opening a hole in the polarizer to increase the transmittance of the first area, it is also possible to make the transmittance of the first area larger than that of the second area by using a material having a higher transmittance in the first area (for example, a material for making an electrode). Optionally, an internal material, such as a liquid crystal electrode, may not be disposed in the first area of the LCD surface, thus the transmittance of the first area may be greater than the transmittance of the second area.

A method of fabricating the LCD in an embodiment of the present disclosure will be briefly described. The method can include a first step of providing an LCD panel, a second step of forming an ink layer on a surface of a LCD substrate. For example, the ink layer can be formed by a screen printing technique or an ink transfer printing technique. The ink layer is in an annular shape and is located at a position corresponding to the position where the camera or other device needs to be set.

The method can also include a third step of attaching the first polarizer and the second polarizer to opposite surfaces of the LCD substrate, so that centers of the second through holes on the first polarizer and the second polarizer are coincident, and a center of the second through hole coincides with a center of the annular ink layer.

Further, the method can include a fourth step of adhering the backlight module having the first through hole to a side of the second polarizer away from the LCD panel by the light shielding black adhesive, so that the center of the first through hole on the backlight module coincides with the center of the second through hole on the second polarizer.

Finally, the method can include bonding the backlight module, the second polarizer, and the LCD panel using a sealant. The hot melt adhesive is applied around the first through hole such that the hot melt adhesive adheres to the inner wall of the first through hole, the inner wall of the second through hole, and the surface of the LCD panel. After the hot melt adhesive is statically cured, the sealant is formed to bond the backlight module and the LCD panel.

The embodiment of the present disclosure can further provide a display device including the LCD and the image capture device shown in any one of FIG. 2 to FIG. 6, and the photosensitive component of the image capture device corresponds to the blind hole 7.

Illustratively, the display device includes, but is not limited to, a cell phone, a tablet, a laptop, and the like.

Other embodiments of the present disclosure will be apparent to those skilled in the art after considering the description and implementing the disclosure. The present application is intended to cover any variations, uses, or adaptations of the present disclosure, which are in accordance with the general principles of the disclosure and include common general knowledge or common technical means in the art that are not disclosed in the present disclosure. The description and embodiments are to be regarded as illustrative only. The true scope and spirit of the disclosure is pointed out by the appended claims.

It is to be understood that the disclosure is not limited to the precise structure described in the above and illustrated in the drawings, and can make various modifications and changes without departing from the scope thereof. The scope of the disclosure is to be limited only by the appended claims.

What is claimed is:

1. A liquid crystal display, comprising:
   a liquid crystal display panel;
   a backlight module having a first through hole therein and being located on one side of the liquid crystal display panel; and
   a first polarizer having a second through hole therein and being located between the liquid crystal display panel and the backlight module,
   wherein the first through hole, the second through hole, and the liquid crystal display panel are arranged to define a blind hole, and a sealant is adhered to an inner wall of the blind hole to fixedly bond the backlight module, the liquid crystal display panel, and the first polarizer together,
   wherein the liquid crystal display panel further comprising a first light shielding layer, wherein the first light shielding layer is located on an upper surface of the liquid crystal display panel, the upper surface is a side of the liquid crystal display panel away from the first polarizer, and the orthographic projection of the sealant is located in the orthographic projection of the first light shielding layer.

2. The liquid crystal display according to claim 1, wherein the sealant is a structure by which the backlight module, the liquid crystal display panel, and the first polarizer are integrally bonded and fixedly connected.

3. The liquid crystal display panel according to claim 1, wherein the liquid crystal display panel further includes a light shielding layer surrounding the first through hole, wherein an orthographic projection of the sealant on the liquid crystal display panel is located in an orthographic projection of the light shielding layer on the liquid crystal display panel.

4. The liquid crystal display according to claim 3, wherein the light shielding layer is located on a lower surface and/or the upper surface of the liquid crystal display panel, and the lower surface is a side of the liquid crystal display panel adjacent to the first polarizer.

5. The liquid crystal display according to claim 3, wherein the light shielding layer is located within the liquid crystal display panel.

6. The liquid crystal display according to claim 4, wherein the light shielding layer is located between a lower surface of the liquid crystal display panel and the first polarizer.

7. The liquid crystal display according to claim 6, wherein the light shielding layer is bonded to the sealant.

8. The liquid crystal display according to claim 4, wherein the liquid crystal display further comprises a second polarizer, and the light shielding layer is located between the upper surface of the liquid crystal display panel and the second polarizer, and the second polarizer has a third through hole corresponding to the second through hole.

9. The liquid crystal display according to claim 5, wherein the light shielding layer is a black matrix disposed inside the liquid crystal display panel.

10. The liquid crystal display panel according to claim 9, the liquid crystal display panel further comprising a first light shielding layer or a second light shielding layer, wherein the second light shielding layer is located on a lower surface of the liquid crystal display panel, wherein the light shielding layer is located in an orthographic projection of the first light shielding layer or the second light shielding layer on the liquid crystal display panel.

11. The liquid crystal display according to claim 1, wherein the liquid crystal display further comprises a light shielding black adhesive layer located between the backlight module and the first polarizer, and the light shielding black adhesive layer surrounds the first through hole.

12. The liquid crystal display according to claim 11, wherein a distance (a) of a side of a light shielding layer away from a central axis (y) of the first through hole and the central axis (y) is not greater than a distance (b) of a side of the light shielding black adhesive layer away from the central axis (y) and the central axis (y).

13. The liquid crystal display according to claim 1, wherein a material of the sealant is a hot melt adhesive.

14. The liquid crystal display according to claim 3, wherein the light shielding layer is an ink layer.

15. The liquid crystal display according to claim 1, wherein a display area of the liquid crystal display panel has a first area opposite to the blind hole and a second area except the first area, and a transmittance of the first area is greater than a transmittance of the second area.

16. A display device comprising the liquid crystal display according to claim 1, wherein a photosensitive component of an image capture device is located opposite to the blind hole.

* * * * *